(12) United States Patent
Shiota et al.

(10) Patent No.: US 8,358,495 B2
(45) Date of Patent: Jan. 22, 2013

(54) LAMINATED CERAMIC ELECTRONIC COMPONENT

(75) Inventors: Akihiro Shiota, Yasu (JP); Tomoyuki Nakamura, Moriyama (JP); Tomonori Muraki, Maibara (JP); Makoto Matsuda, Moriyama (JP); Masayuki Ishihara, Yasu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 226 days.

(21) Appl. No.: 12/873,581

(22) Filed: Sep. 1, 2010

(65) Prior Publication Data

US 2011/0069424 A1   Mar. 24, 2011

(30) Foreign Application Priority Data

Sep. 24, 2009 (JP) ................................. 2009-218589

(51) Int. Cl.
*H01G 4/06* (2006.01)
*C04B 35/00* (2006.01)

(52) U.S. Cl. .................................... 361/321.2; 501/137

(58) Field of Classification Search .... 361/321.1–321.5, 361/311; 501/137–139
See application file for complete search history.

(56) References Cited

U.S. PATENT DOCUMENTS

| 6,295,196 B1 * | 9/2001 | Hamaji et al. ............. 361/321.2 |
| 7,259,957 B2 | 8/2007 | Iwanaga |
| 2003/0016484 A1 * | 1/2003 | Iwaida et al. ............. 361/306.3 |
| 2006/0177678 A1 | 8/2006 | Iwanaga |
| 2006/0232911 A1 * | 10/2006 | Ito et al. ..................... 361/321.4 |

FOREIGN PATENT DOCUMENTS

| CN | 1279490 A | 1/2001 |
| CN | 1423288 A | 6/2003 |
| JP | 8-031232 A | 2/1996 |
| JP | 2002-173368 A | 6/2002 |
| JP | 2003-234242 A | 8/2003 |
| JP | 2006-041393 A | 2/2006 |
| JP | 2006-319359 A | 11/2006 |
| JP | 2008-016706 A | 1/2008 |
| JP | 2008-030973 A | 2/2008 |

* cited by examiner

*Primary Examiner* — Eric Thomas
(74) *Attorney, Agent, or Firm* — Dickstein Shapiro LLP

(57) ABSTRACT

It is harder to realize structural defects when the thickness of an internal electrode is reduced in a laminated ceramic electronic component, such as a laminated ceramic capacitor, when the internal electrodes contain a base metal as their conductive constituent, and the dielectric ceramic layers are formed from a dielectric barium titanate ceramic, and as an accessory constituent, at least one alkali metal element selected from Li, K, and Na, each of the internal electrodes has a thickness of 0.5 μm or less, and the content of the alkali metal element in the dielectric ceramic is 0.2 parts by mol or more with respect to 100 parts by mol of the main constituent.

17 Claims, 1 Drawing Sheet

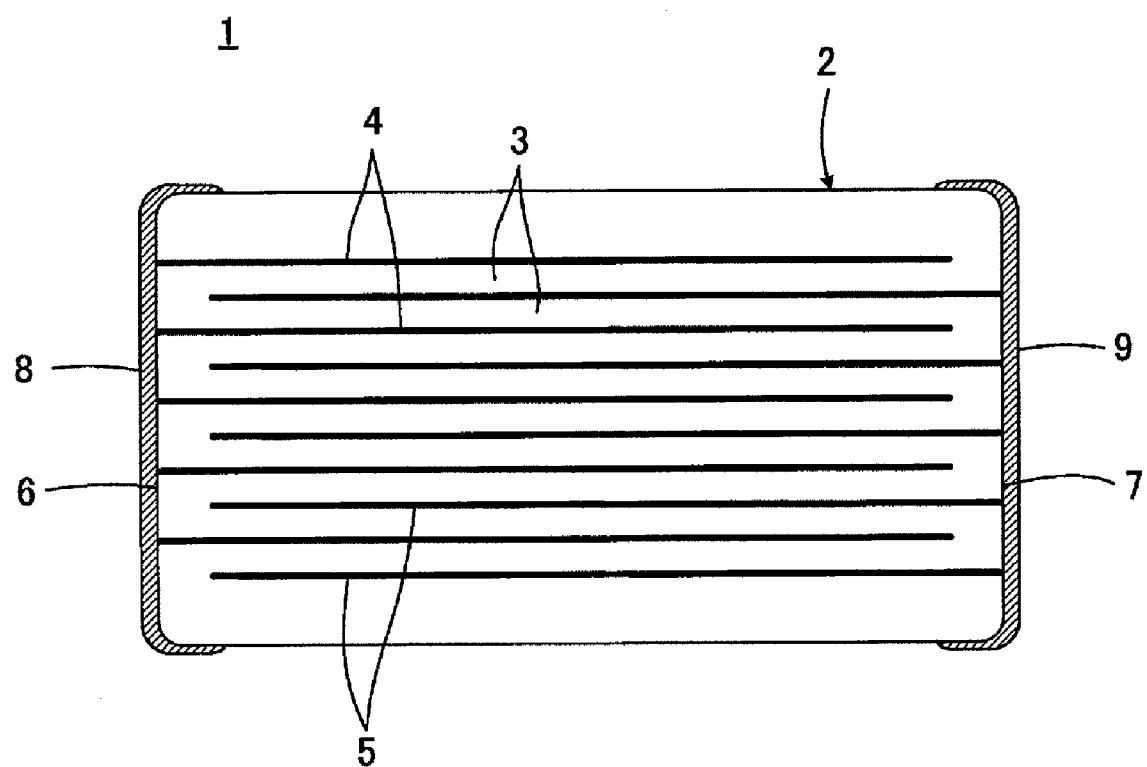

LAMINATED CERAMIC ELECTRONIC COMPONENT

BACKGROUND OF THE INVENTION

1. Field of the Invention

The present invention relates to a laminated ceramic electronic component, and more particularly, relates to an improvement for reducing the layer thickness of an internal electrode in a laminated ceramic electronic component.

2. Description of the Related Art

For reduction of laminated ceramic electronic components in size, i.e., in thickness, it is effective to try to reduce the layer thickness of not only ceramic layers but also internal electrodes. For reduction of the internal electrode layer thickness, it is desirable that the thickness of the internal electrode be reduced to, for example, 0.5 μm or less.

However, when the internal electrodes have been reduced in layer thickness, the calcination for sintering raw laminates makes the electrodes more likely to be broken, thereby making the dielectric coverage of the internal electrodes to be decreased easily. In order to prevent this electrode breakage, it is necessary to sinter the ceramic constituting the ceramic layers at lower temperatures during calcination.

While it is common to add $SiO_2$ as a sintering aid to the ceramic for the purpose of sintering at lower temperatures, a Li compound or the like may be added in the case of desiring sintering at further lower temperatures.

For example, in Japanese Patent Application Laid-Open No. 8-31232 (Patent Document 1), a rare earth element, Mn, Mg, Li, and Si are added to a $BaTiO_3$ based dielectric ceramic. However, when the resulting dielectric ceramic is used as a material for dielectric ceramic layers in a laminated ceramic capacitor, a problem of structural defects are likely to be encountered. This problem is believed to arise from expansion due to oxidation of the internal electrode.

SUMMARY OF THE INVENTION

Therefore, an object of the present invention is to provide a laminated ceramic electronic component which can solve the problem described above.

The present invention is directed to a laminated ceramic electronic component including: a laminate having a plurality of stacked ceramic layers and a plurality of internal electrodes formed along interfaces between the ceramic layers; and a plurality of external electrodes formed in different positions from each other on an outer surface of the laminate and electrically connected to specific ones of the internal electrodes, wherein the internal electrodes contain a base metal as their conductive constituent, and the ceramic layers includes a ceramic containing, as its main constituent, $ABO_3$ (A necessarily contains Ba, and may further contain at least one of Ca and Sr, whereas B necessarily contains Ti, and may further contain at least one of Zr and Hf), and containing, as an accessory constituent, at least one alkali metal element selected from Li, K, and Na, and is characterized by the following aspects in order to solve the technical problem described above.

More specifically, the laminated ceramic electronic component is characterized in that each of the internal electrodes has a thickness of 0.5 μm or less, and that the content of the alkali metal element is 0.2 parts by mol or more with respect to 100 parts by mol of the main constituent in the ceramic.

Each of the internal electrodes preferably has a thickness of 0.3 μm or less.

Preferably, the alkali metal element contains at least one of Li, K and Na, in particular Li, and the content of the Li is 0.2 parts by mol or more with respect to 100 parts by mol of the main constituent.

Each of the ceramic layers preferably has a thickness of 1 μm or less.

The content of the alkali metal element is preferably 3.5 parts by mol or less with respect to 100 parts by mol of the main constituent.

The internal electrodes preferably contain Ni as their main constituent.

According to the present invention, structural defects can be reduced in the laminated ceramic electronic component.

When the internal electrode is made thinner to have a thickness of 0.3 μm or less, structural defects can be further reduced, as compared with internal electrodes with a thickness greater than 0.3 μm.

When the ceramic contains Li as an alkali metal element, and when the content of Li is 0.2 parts by mol or more with respect to 100 parts by mol of the main constituent in the ceramic, structural defects can be further reduced, as compared with ceramics containing no Li.

When the ceramic layer has a thickness of 1 μm or less, the dielectric constant of the ceramic itself is improved, as compared with a case in which the thickness of a ceramic layer is greater than 1 μm.

In addition, when the content of the alkali earth metal is 3.5 parts by mol or less with respect to 100 parts by mol of the main constituent in the ceramic, the dielectric constant can be improved as compared with a case in which the content is greater than 3.5 parts by mol.

BRIEF DESCRIPTION OF THE DRAWINGS

FIG. 1 is a cross-sectional view schematically illustrating a laminated ceramic capacitor 1 according to an embodiment of the present invention.

DETAILED DESCRIPTION OF THE INVENTION

FIG. 1 is a cross-sectional view illustrating a laminated ceramic capacitor 1 as an example of a laminated ceramic electronic component with a ceramic according to the present invention applied.

The laminated ceramic capacitor 1 includes a laminate 2 as a component main body. The laminate 2 includes a plurality of stacked dielectric ceramic layers 3 and a plurality of internal electrodes 4 and 5 formed along interfaces between the dielectric ceramic layers 3. The plurality of internal electrodes 4 and 5 have respective ends exposed at one and the other end surfaces 6 and 7 of the laminate 2, and external electrodes 8 and 9 are formed so that the respective ends of the internal electrodes 4 are electrically connected to each other and the respective ends of the internal electrodes 5 are electrically connected to each other.

For producing this laminated ceramic capacitor 1, a raw laminate for the laminate 2 is first produced in accordance with a well known method such as a method of stacking ceramic green sheets with the internal electrodes 4 and 5 printed on them. Then, a calcination step is carried out in order to sinter the raw laminate. The external electrodes 8 and 9 are then formed respectively on the end surfaces 6 and 7 of the sintered laminate 2, thereby completing the laminated ceramic capacitor 1.

In the present invention, the internal electrodes 4 and 5 contain, as their conductive constituent, for example, a base metal such Ni or Cu, and preferably Ni.

The dielectric ceramic layers 3 are formed from a dielectric ceramic containing, as its main constituent, $ABO_3$ where A necessarily contains Ba, and may further contain at least one of Ca and Sr, whereas B necessarily contains Ti, and may further contain at least one of Zr and Hf, and containing, as an accessory constituent, at least one alkali metal element selected from Li, K, and Na. In this case, the content of the alkali metal element described above is 0.2 parts by mol or more with respect to 100 parts by mol of the main constituent mentioned above.

The internal electrodes 4 and 5 each have a thickness of 0.5 μm or less.

When the conditions as described above are met, it is possible to make it harder to have failures due to structural defects in the laminated ceramic capacitor 1. In general, internal electrodes are easily formed into a spherical shape during a calcination process, and thus likely to cause structural defects due to the internal electrodes being broken. However, in the case of the conditions described above being met, it has been surprisingly found that structural defects will be considerably reduced when the internal electrodes 4 and 5 are thinner. The reason for this reduction can be presumed as follows.

With respect to the alkali metal element remaining after a calcination process, it seems that most of the alkali metal element is present as a solid solution in an oxide phase at the surfaces of the internal electrodes 4 and 5 during the calcination process, and remains as it is after the calcination process.

The alkali metal ions are monovalent, whereas Ni ions are bivalent when the internal electrodes 4 and 5 contain Ni as their conductive constituent. Thus, one Ni ion is substituted with two alkali metal ions to maintain a constant valence in a solid solution. As a result, the number of cations present in the internal electrodes 4 and 5 is increased, and that reduces the distances between the cations. In this case, when the internal electrodes 4 and 5 come to have a thickness of 0.5 μm or less, the mobility of the Ni ions will be significantly decreased, thereby making it harder to reach the surfaces of the internal electrodes 4 and 5. Therefore, the Ni will have less opportunity to come into contact with oxygen in the atmosphere, and make the internal electrodes 4 and 5 less likely to be oxidized.

It is presumed that preventing the internal electrodes 4 and 5 from being oxidized in this way allows structural defects to be prevented.

The advantageous effect described above is achieved only if a monovalent cation is present in a solid solution, and thus can be said to be an effect unique to the alkali metal element.

It is to be noted that while all of alkali metal elements present therein are desirably present as a solid solution in the oxide phase, which is not critical, some of the alkali metal elements may be present as a segregated phase at the interfaces and in the dielectric ceramic layers 3.

While the internal electrodes 4 and 5 contain Ni as their conductive constituent in the description above, the same applies to a case in which the internal electrodes 4 and 5 contain a base metal other than Ni as the conductive constituent.

It is to be noted that the laminated ceramic capacitor with the present invention applied is not limited to a capacitor which has the structure as shown in FIG. 1, and for example, may be a capacitor configured in such a way that a plurality of internal electrodes form a series capacitance within the capacitor main body, or a capacitor which has a multi-terminal structure, such as a laminated ceramic capacitor in the form of an array or a lower-ESL type laminated ceramic capacitor.

In addition, the present invention can be applied to laminated ceramic electronic components other than the laminated ceramic capacitors.

Experimental examples carried out in accordance with the present invention will be described below.

EXPERIMENTAL EXAMPLE 1

Experimental Example 1 was carried out for specifying the scope of the present invention in terms of the content of the alkali metal element and the thickness of the internal electrode.

(A) Production of Dielectric Raw Material Compound

Respective powders of $BaTiO_3$, $Li_2CO_3$, $SiO_2$, and $MgCO_3$ were prepared as starting materials, and $Li_2CO_3$ as an accessory component was added to 100 parts by mol of the $BaTiO_3$ as a main constituent so as to provide Li in the parts by mol shown in the column "Li Content" of Table 1, with the addition of 2.5 parts by mol of the $SiO_2$ and 1.5 parts by mol of the $MgCO_3$, followed by mixing in a ball mill with water as a medium for 12 hours. Then, evaporative drying and calcination were carried out to obtain a dielectric raw material compound.

(B) Production of Laminated Ceramic Capacitor

A ceramic slurry was produced in such a way that a polyvinyl butyral based binder and ethanol were added to the dielectric raw material compound, and mixed in a wet manner in a ball mill for a predetermined period of time.

Next, this ceramic slurry was formed into a sheet in accordance with a lip method to obtain a ceramic green sheet.

Next, a conductive paste containing Ni as its main constituent was applied by screen printing onto the ceramic green sheet to form a conductive paste film to serve as an internal electrode. In this case, the thickness of the conductive paste film applied was adjusted so that the thickness of the calcined internal electrode reached the thickness of 0.2 μm, 0.3 μm, 0.4 μm, 0.5 μm, 0.6 and 0.7 μm, shown in the column "Internal Electrode Thickness" of Table 1.

Next, the multiple ceramic green sheets with the conductive paste film formed thereon were stacked so that the sides to which the conductive paste films were drawn were alternated, thereby providing a raw laminate.

Next, the raw laminate was heated to a temperature of 300° C. in an $N_2$ atmosphere to burn off the binder, and then calcined in a reducing atmosphere including a $H_2$—$N_2$—$H_2O$ gas with an oxygen partial pressure of $10^{-10}$ or $10^{-9}$ MPa, thereby providing a sintered laminate.

Next, a Cu paste containing a $B_2O_3$—$Li_2O$—$SiO_2$—$BaO$ glass frit was applied onto both end surfaces of the sintered laminate, and fired at a temperature of 800° C. in an $N_2$ atmosphere to form external electrodes electrically connected to the internal electrodes, thereby providing a laminated ceramic capacitor.

The laminated ceramic capacitor thus obtained had outer dimensions of 2.0 mm in length, 1.2 mm in width, and 1.0 mm in thickness, and the dielectric ceramic layers interposed between the internal electrodes had a thickness of 0.8 $mm^2$. In addition, the number of the effective dielectric ceramic layers was 100, and the area of the electrode opposed per dielectric ceramic layer was 1.4 $mm^2$.

(C) Evaluation of the Number of Failures

The calcined laminates before the formation of external electrodes were observed in appearance. Laminates with delamination or a crack in the vicinity of the interface between the internal electrode and the dielectric ceramic layer was counted as a failure due to a structural defect, thereby obtaining the number of failures among 100 samples.

The results are shown in Table 1. When the number of failures is 10 or less, the laminate can be determined as an acceptable product.

The internal electrode thickness was measured by polishing the calcined laminates and observing the polished cross sections under an electron microscope.

TABLE 1

| | Sample Number | Internal Electrode Thickness (μm) | Li Content (parts by mol) | The Number of Failure |
|---|---|---|---|---|
| * | 101 | 0.2 | 0.15 | 11 |
| * | 102 | 0.3 | 0.15 | 11 |
| * | 103 | 0.4 | 0.15 | 14 |
| * | 104 | 0.5 | 0.15 | 14 |
| * | 105 | 0.6 | 0.15 | 15 |
| * | 106 | 0.7 | 0.15 | 15 |
| | 107 | 0.2 | 0.2 | 2 |
| | 108 | 0.3 | 0.2 | 1 |
| | 109 | 0.4 | 0.2 | 9 |
| | 110 | 0.5 | 0.2 | 10 |
| * | 111 | 0.6 | 0.2 | 14 |
| * | 112 | 0.7 | 0.2 | 15 |
| | 113 | 0.2 | 0.54 | 1 |
| | 114 | 0.3 | 0.54 | 1 |
| | 115 | 0.4 | 0.54 | 8 |
| | 116 | 0.5 | 0.54 | 10 |
| * | 117 | 0.6 | 0.54 | 13 |
| * | 118 | 0.7 | 0.54 | 13 |
| | 119 | 0.2 | 1.10 | 0 |
| | 120 | 0.3 | 1.10 | 0 |
| | 121 | 0.4 | 1.10 | 6 |
| | 122 | 0.5 | 1.10 | 7 |
| * | 123 | 0.6 | 1.10 | 11 |
| * | 124 | 0.7 | 1.10 | 12 |
| | 125 | 0.2 | 1.5 | 0 |
| | 126 | 0.3 | 1.5 | 0 |
| | 127 | 0.4 | 1.5 | 5 |
| | 128 | 0.5 | 1.5 | 8 |
| * | 129 | 0.6 | 1.5 | 11 |
| * | 130 | 0.7 | 1.5 | 11 |
| | 131 | 0.2 | 2.1 | 0 |
| | 132 | 0.3 | 2.1 | 0 |
| | 133 | 0.4 | 2.1 | 4 |
| | 134 | 0.5 | 2.1 | 6 |
| * | 135 | 0.6 | 2.1 | 12 |
| * | 136 | 0.7 | 2.1 | 12 |
| | 137 | 0.2 | 2.5 | 0 |
| | 138 | 0.3 | 2.5 | 0 |
| | 139 | 0.4 | 2.5 | 5 |
| | 140 | 0.5 | 2.5 | 7 |
| * | 141 | 0.6 | 2.5 | 12 |
| * | 142 | 0.7 | 2.5 | 11 |
| | 143 | 0.2 | 3.0 | 0 |
| | 144 | 0.3 | 3.0 | 0 |
| | 145 | 0.4 | 3.0 | 6 |
| | 146 | 0.5 | 3.0 | 7 |
| * | 147 | 0.6 | 3.0 | 11 |
| * | 148 | 0.7 | 3.0 | 12 |

In Table 1, the sample numbers marked with an asterisk * correspond to samples outside the scope of the present invention.

As is clear from Table 1, the samples within the scope of the present invention meet the conditions of the Li content of 0.2 parts by mol or more and the internal electrode thickness of 0.5 μm or less, with the result that the number of failures is small, namely 10 or less.

In addition, among the samples within the scope of the present invention, the samples which meet the condition of the internal electrode thickness of 0.3 μm or less have a quite small number of failures.

EXPERIMENTAL EXAMPLE 2

Experimental Example 2 was carried out for comparing alkali metal elements as accessory constituents of a dielectric ceramic.

(A) Production of Dielectric Raw Material Compound

Respective powders of $BaTiO_3$, $Na_2CO_3$, $K_2CO_3$, $Li_2CO_3$, $SiO_2$, and $MgCO_3$ were prepared as starting materials. The $Na_2CO_3$, $K_2CO_3$, and $Li_2CO_3$ used as accessory components are shown in the column "Alkali Metal" of Table 2, and were added to 100 parts by mol of the $BaTiO_3$ as a main constituent so as to provide the parts by mol shown in the column "Alkali Content" of Table 2, with the addition of 2.5 parts by mol of the $SiO_2$ and 1.5 parts by mol of the $MgCO_3$, followed by mixing in a ball mill with water as a medium for 12 hours. Then, evaporative drying and calcination were carried out to obtain a dielectric raw material compound.

(B) Production of Laminated Ceramic Capacitor

The dielectric raw material compound was used to produce a laminate ceramic capacitor in the same way as in the case of Experimental Example 1. In this case, the thickness of the applied conductive paste film to serve as an internal electrode was adjusted so that the thickness of the calcined internal electrode was 0.2 μm, 0.4 μm, or 0.6 μm, as shown in the column "Internal Electrode Thickness" of Table 2.

(C) Evaluation of the Number of Failures

The number of failures with structural defects caused was evaluated in the same way as in the case of Experimental Example 1. The results are shown in Table 2.

TABLE 2

| | Sample Number | Alkali Metal | Internal Electrode Thickness (μm) | Alkali Content (parts by mol) | Number of Failures |
|---|---|---|---|---|---|
| | 201 | Li | 0.2 | 1.0 | 0 |
| | 202 | Li | 0.4 | 1.0 | 6 |
| * | 203 | Li | 0.6 | 1.0 | 11 |
| | 204 | Li | 0.2 | 2.0 | 0 |
| | 205 | Li | 0.4 | 2.0 | 4 |
| * | 206 | Li | 0.6 | 2.0 | 11 |
| | 207 | Li | 0.2 | 3.0 | 0 |
| | 208 | Li | 0.4 | 3.0 | 6 |
| * | 209 | Li | 0.6 | 3.0 | 11 |
| | 210 | Na | 0.2 | 1.1 | 8 |
| | 211 | Na | 0.4 | 1.1 | 9 |
| * | 212 | Na | 0.6 | 1.1 | 14 |
| | 213 | Na | 0.2 | 2.1 | 8 |
| | 214 | Na | 0.4 | 2.1 | 8 |
| * | 215 | Na | 0.6 | 2.1 | 12 |
| | 216 | Na | 0.2 | 3.0 | 7 |
| | 217 | Na | 0.4 | 3.0 | 8 |
| * | 218 | Na | 0.6 | 3.0 | 12 |
| | 219 | K | 0.2 | 1.1 | 6 |
| | 220 | K | 0.4 | 1.1 | 9 |
| * | 221 | K | 0.6 | 1.1 | 16 |
| | 222 | K | 0.2 | 2.1 | 7 |
| | 223 | K | 0.4 | 2.1 | 6 |
| * | 224 | K | 0.6 | 2.1 | 13 |
| | 225 | K | 0.2 | 3.0 | 8 |
| | 226 | K | 0.4 | 3.0 | 7 |
| * | 227 | K | 0.6 | 3.0 | 12 |

In Table 2, the sample numbers with an asterisk * correspond to samples outside the scope of the present invention.

As is clear from Table 2, the use of any of the alkali metal elements achieved the same effect in terms of reduction in the number of failures as in the case of Experimental Example 1. However, the addition of Li achieved a more significant effect in terms of reduction in the number of failures, as compared with the addition of the other alkali metals. While the reason for this significant effect is not clearly identified, it is believed that Li is more likely to be present as a solid solution in the internal electrodes, or that the phase in which Li is present as a solid solution has a more significant effect, as compared with the phase in which the other alkali metal element is present as a solid solution.

EXPERIMENTAL EXAMPLE 3

In Experimental Example 3, the effect of the thickness of the dielectric ceramic layer on the dielectric constant was studied.

(A) Production of Dielectric Raw Material Compound

A dielectric raw material compound was obtained in the same way as in the case of Experimental Example 1, except that the $Li_2CO_3$ as an accessory component was added to 100 parts by mol of the $BaTiO_3$ as a main constituent so as to provide Li in parts by mol shown in the column "Li Content" of Table 3.

(B) Production of Laminated Ceramic Capacitor

The dielectric raw material compound was used to produce a laminate ceramic capacitor in the same way as in the case of Experimental Example 1. In this case, the thickness of the ceramic green sheet was adjusted so that the thickness of the calcined dielectric ceramic layer was 0.8 μm, 1.0 μm, 1.2 μm, or 1.4 μm, as shown in the column "Dielectric Layer Thickness" of Table 3. The thickness of the conductive paste film applied was adjusted so that the thickness of the internal electrodes were 0.5 μm after the calcination.

(C) Characterization

For the laminated ceramic capacitors obtained, AC 1.0 V was applied at a frequency of 1 kHz at room temperature with the use of an LCR meter to measure their capacitances. Then, the dielectric constants were calculated from the capacitance values. The results are shown in Table 3. In this case, when the dielectric constant is less than 1800, the capacitor can be determined as a failure.

TABLE 3

|   | Sample Number | Dielectric Layer Thickness (μm) | Li Content (parts by mol) | Dielectric Constant |
|---|---|---|---|---|
|   | 301 | 0.8 | 1.0 | 2412 |
|   | 302 | 1.0 | 1.0 | 2213 |
| Δ | 303 | 1.2 | 1.0 | 1753 |
| Δ | 304 | 1.4 | 1.0 | 1781 |
|   | 305 | 0.8 | 1.5 | 2232 |
|   | 306 | 1.0 | 1.5 | 2127 |
| Δ | 307 | 1.2 | 1.5 | 1752 |
| Δ | 308 | 1.4 | 1.5 | 1703 |
|   | 309 | 0.8 | 2.1 | 2064 |
|   | 310 | 1.0 | 2.1 | 2107 |
| Δ | 311 | 1.2 | 2.1 | 1712 |
| Δ | 312 | 1.4 | 2.1 | 1735 |
|   | 313 | 0.8 | 2.6 | 1951 |
|   | 314 | 1.0 | 2.6 | 1908 |
| Δ | 315 | 1.2 | 2.6 | 1753 |
| Δ | 316 | 1.4 | 2.6 | 1697 |
|   | 317 | 0.8 | 3.1 | 1870 |
|   | 318 | 1.0 | 3.1 | 1811 |
| Δ | 319 | 1.2 | 3.1 | 1654 |
| Δ | 320 | 1.4 | 3.1 | 1566 |

In Table 3, the sample numbers with a symbol Δ correspond to the samples with the "Dielectric Layer Thickness" greater than 1.0 μm.

It has been determined from Table 3 that the dielectric constant is increased to 1800 or more when the thickness of the dielectric ceramic layer is 1.0 μm or less. It is believed as the reason for this determination is that when the dielectric ceramic layer is thicker, the added Li fails to move to the interface between the Li and the internal electrode and partially remains in the dielectric ceramic layer, and generates a segregated phase in some cases. Therefore, the thickness of the dielectric ceramic layer is desirably 1.0 μm or less in order to achieve higher dielectric constants in the present invention.

The number of failures due to structural defects was 10 or less for all of the samples produced in Experimental Example 3.

EXPERIMENTAL EXAMPLE 4

In Experimental Example 4, the effect of the thickness of the dielectric ceramic layer on the dielectric constant was studied in the same way as in the case of Experimental Example 3, using each of Li, Na, and K as the alkali metal element in the same way as in the case of Experimental Example 2.

(A) Production of Dielectric Raw Material Compound

As in the case of Experimental Example 2, respective powders of $BaTiO_3$, $Na_2CO_3$, $K_2CO_3$, $Li_2CO_3$, $SiO_2$, and $MgCO_3$ were prepared as starting materials, the $Na_2CO_3$, $K_2CO_3$, and $Li_2CO_3$ as accessory components were used as shown in the column "Alkali Metal" of Table 4, and added to 100 parts by mol of the $BaTiO_3$ as a main constituent so as to provide the parts by mol shown in the column "Alkali Content" of Table 4, with the addition of 2.5 parts by mol of the $SiO_2$ and 1.5 parts by mol of the $MgCO_3$, followed by mixing in a ball mill with water as a medium for 12 hours. Then, evaporative drying and calcination were carried out to obtain a dielectric raw material compound.

(B) Production of Laminated Ceramic Capacitor

The dielectric raw material compound was used to produce a laminate ceramic capacitor in the same way as in the case of Experimental Example 3. In this case, the thickness of the ceramic green sheet was adjusted so that the thickness of the calcined dielectric ceramic layer was 0.8 μm or 1.0 μm, as shown in the column "Dielectric Layer Thickness" of Table 4. The thickness of the conductive paste film applied was adjusted so that the thickness of the internal electrode was reached 0.5 μm after the calcination.

(C) Characterization

The dielectric constants were obtained in the same way as in the case of Experimental Example 3. The results are shown in Table 4.

TABLE 4

|   | Sample Number | Alkali Metal | Dielectric Layer Thickness (μm) | Alkali Content (parts by mol) | Dielectric Constant |
|---|---|---|---|---|---|
|   | 401 | Li | 0.8 | 2.5 | 1951 |
|   | 402 | Li | 1.0 | 2.5 | 1908 |
|   | 403 | Li | 0.8 | 3.0 | 1870 |
|   | 404 | Li | 1.0 | 3.0 | 1811 |
| Δ | 405 | Li | 0.8 | 3.6 | 1650 |
| Δ | 406 | Li | 1.0 | 3.6 | 1643 |
|   | 407 | Na | 0.8 | 2.5 | 2002 |
|   | 408 | Na | 1.0 | 2.5 | 1989 |
|   | 409 | Na | 0.8 | 3.0 | 1859 |
|   | 410 | Na | 1.0 | 3.0 | 1892 |
| Δ | 411 | Na | 0.8 | 3.6 | 1701 |
| Δ | 412 | Na | 1.0 | 3.6 | 1664 |
|   | 413 | K | 0.8 | 2.5 | 1924 |
|   | 414 | K | 1.0 | 2.5 | 1921 |
|   | 415 | K | 0.8 | 3.0 | 1865 |
|   | 416 | K | 1.0 | 3.0 | 1883 |
| Δ | 417 | K | 0.8 | 3.6 | 1726 |
| Δ | 418 | K | 1.0 | 3.6 | 1731 |

In Table 4, the sample numbers with a symbol Δ correspond to the samples with the alkali content greater than 3.5 parts by mol.

It is determined from Table 4 that in the case of using any of the alkali metal elements, the dielectric constant significantly decreased after the calcination process when the alkali content is more than 3.5 parts by mol, as compared with the cases using 3.5 parts by mol or less. It is believed as the reason for this determination so that when the alkali content is higher, all of the alkali metal is not able to be present at the interfacial sections between the alkali and the internal electrodes, and partially remains in the dielectric ceramic layer, and generates a segregated phase in some cases. Therefore, the alkali content is desirably 3.5 parts by mol or less in order to achieve higher dielectric constants in the present invention.

The number of failures due to structural defects was 10 or less for all of the samples produced in Experimental Example 4.

While $BaTiO_3$ was used as the main constituent $ABO_3$ of the dielectric ceramic in Experimental Examples 1 to 4 described above, it has been confirmed that the same results are obtained even when a main constituent is used in which some of Ba at the A site is substituted with at least one of Ca and Sr, or even when a main constituent is used in which some of Ti at the B site is substituted with at least one of Zr and Hf.

What is claimed is:

1. A laminated ceramic electronic component comprising:
a laminate having a plurality of stacked ceramic layers and a plurality of internal electrodes disposed at different interfaces between the ceramic layers; and
two external electrodes at different positions on an outer surface of the laminate and electrically connected to different ones of the internal electrodes,
wherein the internal electrodes comprise a base metal and have a thickness of 0.3 μm or less,
wherein the ceramic layers comprise a ceramic containing, as its main constituent, $ABO_3$ in which A is Ba or Ba and at least one of Ca and Sr, and B is Ti or Ti and at least one of Zr and Hf), and containing, as an accessory constituent, at least one alkali metal element selected from the group consisting of Li, K, and Na,
wherein the content of the alkali metal element is 0.2 parts by mol or more with respect to 100 parts by mol of the main constituent, and
wherein the internal electrodes have edge surfaces which contact the aforesaid ceramic except where electrically connected to an external electrode.

2. The laminated ceramic electronic component according to claim 1, wherein the alkali metal element comprises Li.

3. The laminated ceramic electronic component according to claim 2, wherein each of the ceramic layers has a thickness of 1 μm or less.

4. The laminated ceramic electronic component according to claim 3, wherein the content of the alkali metal element is 3.5 parts by mol or less with respect to 100 parts by mol of the main constituent.

5. The laminated ceramic electronic component according to claim 4, wherein the base metal comprises Ni.

6. The laminated ceramic electronic component according to claim 5, wherein each of the ceramic layers has a thickness of 0.8 μm or more.

7. The laminated ceramic electronic component according to claim 1, wherein each of the ceramic layers has a thickness of 1 μm or less.

8. The laminated ceramic electronic component according to claim 7, wherein the content of the alkali metal element is 3.5 parts by mol or less with respect to 100 parts by mol of the main constituent.

9. The laminated ceramic electronic component according to claim 8, wherein the base metal comprises Ni.

10. The laminated ceramic electronic component according to claim 1, wherein the content of the alkali metal element is 3.5 parts by mol or less with respect to 100 parts by mol of the main constituent.

11. The laminated ceramic electronic component according to claim 10, wherein the base metal comprises Ni.

12. The laminated ceramic electronic component according to claim 1, wherein the base metal comprises Ni.

13. The laminated ceramic electronic component according to claim 1, wherein each of the ceramic layers has a thickness of 0.8 to 1 μm.

14. The laminated ceramic electronic component according to claim 13, wherein the ceramic is barium titanate.

15. The laminated ceramic electronic component according to claim 14, wherein the alkali metal is Li.

16. The laminated ceramic electronic component according to claim 14, wherein the alkali metal is K.

17. The laminated ceramic electronic component according to claim 14, wherein the alkali metal is Na.

* * * * *